United States Patent [19]
Zukauskas

[11] 3,964,261
[45] June 22, 1976

[54] AUXILIARY HYDRAULIC POWER CIRCUIT FOR A HYDRAULIC POWER TRANSMISSION SYSTEM

[75] Inventor: Bernard M. J. Zukauskas, Saint Quentin Falavier, France

[73] Assignee: International Harvester Company, Chicago, Ill.

[22] Filed: Jan. 24, 1975

[21] Appl. No.: 543,710

[30] Foreign Application Priority Data
Jan. 24, 1974  France .............................. 74.04421

[52] U.S. Cl. ................................. 60/445; 60/452; 60/486; 417/286
[51] Int. Cl.² ..................... F16H 39/46; F15B 13/09
[58] Field of Search ............. 60/420, 428, 445, 452, 60/486, 484; 417/286; 137/109, 118

[56] References Cited
UNITED STATES PATENTS

| | | | |
|---|---|---|---|
| 2,933,897 | 4/1960 | Toutant | 60/486 X |
| 2,965,254 | 12/1960 | Bowles | 91/411 R UX |
| 3,866,420 | 2/1975 | Appel | 60/445 |
| 3,874,173 | 4/1975 | Wilkins | 60/445 X |

FOREIGN PATENTS OR APPLICATIONS

| | | | |
|---|---|---|---|
| 966,158 | 7/1957 | Germany | 60/484 |
| 201,235 | 7/1923 | United Kingdom | 60/484 |

*Primary Examiner*—Edgar W. Geoghegan
*Attorney, Agent, or Firm*—Raymond E. Parks; Floyd B. Harman

[57] ABSTRACT

A motor-pump unit is used in combination with an existing hydraulic power transmission system to create an additional or auxiliary hydraulic power circuit.

1 Claim, 2 Drawing Figures ial patent application No.
AUXILIARY HYDRAULIC POWER CIRCUIT FOR A HYDRAULIC POWER TRANSMISSION SYSTEM

BACKGROUND OF THE INVENTION

The present invention relates to a hydraulic power transmission system having one or more hydraulic circuits for distributing or apportioning hydraulic power in addition to any existing power circuits.

1. Field of The Invention

This invention relates to a hydraulic power transmission system for use in material handling machinery such as a hydraulic power shovel. The invention utilizes a motor-pump unit to create an auxiliary hydraulic power circuit in addition to any existing power circuits. The motor of the unit is run by the fluid from one of the existing power circuits and operates to drive the pump of the unit. The pump feeds fluid to a second power line which is a part of an auxiliary hydraulic power circuit.

2. Description Of The Prior Art

In the United Kingdom Pat. No. 1,128,657, published on Oct. 2, 1968, with a priority filing date of Sept. 30, 1964 based on a German patent application No. G41650ic/59a, there is taught a hydraulic power transmission system such as is shown in FIG. 1 of the attached drawing. FIG. 1 illustrates diagrammatically the general arrangement of a motor M which drives a plurality of hydraulic variable delivery pumps P1, P2. Each pump supplies hydraulic fluid to its respective hydraulic power line L1, L2 leading to respective distributing units B1, B2. A regulator R is provided for simultaneously changing the outputs of the pair of pumps P1 and P2 as a function of the sum of the pressures prevailing in both circuits, whereby the sum of the powers absorbed by each line remains constant. With this arrangement, it is obviously difficult to operate simultaneously and in a completely independent manner a plurality of load circuits from the same distributing unit. Consequently the total power available cannot be properly distributed among the various receivers. This is observed notably in hydraulic power shovels, comprising for example a unit B1 for distributing pressure fluid to the boom luffing motion, operating the bucket and the left-hand translation motor, and another unit B2 for distributing pressure fluid to the bucket arm control motion, the right-hand translation motor and the turret slewing mechanism. In this case, only two simultaneous working movements are permitted, namely one movement for each pump P1, P2, for any increment in the number of pumps would reduce considerably the power available for each movement.

It is the primary object of the present invention to avoid these inconveniences by improving the versatility of a hydraulic circuit of known type and therefore increasing the working capacity of a machine equipped to such circuit.

SUMMARY OF THE INVENTION

In accordance with the present invention there is provided a hydraulic power distributor or transmission system which is adapted to subdivide the hydraulic power output from a pump among a plurality of independent circuits, wherein the pump flow operates a motor of a motor-pump unit to run the pump of the unit and provide an auxiliary circuit with fluid, and the discharge of the motor providing fluid for a second independent circuit of the plurality, which is a continuation of the first mentioned pump flow.

The motor of the unit absorbs a fraction of the hydraulic power available in the upstream line of the second independent circuit in operating the pump of the unit and delivers another fraction to the subsidiary line, whereby the power delivered by the first mentioned pump is distributed between two independent lines.

A pressure regulator is provided in the line between the first mentioned pump and the motor of the unit to protect the motor-pump unit from excessive pressure.

DESCRIPTION OF THE PREFERRED EMBODIMENT

Figure 1:
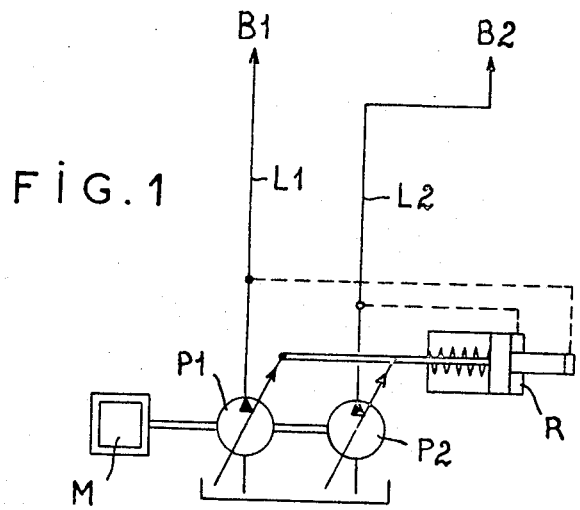
FIG. 1 is a diagrammatical illustration of the prior art hydraulic power transmission.

In order that the invention may be readily understood and put into practical effect, reference will now be made to the various figures of the drawing, and more particularly to FIG. 2 thereof, illustrating diagrammatically by way of example a typical form of embodiment of the hydraulic power distributor according to this invention.

Figure 2:
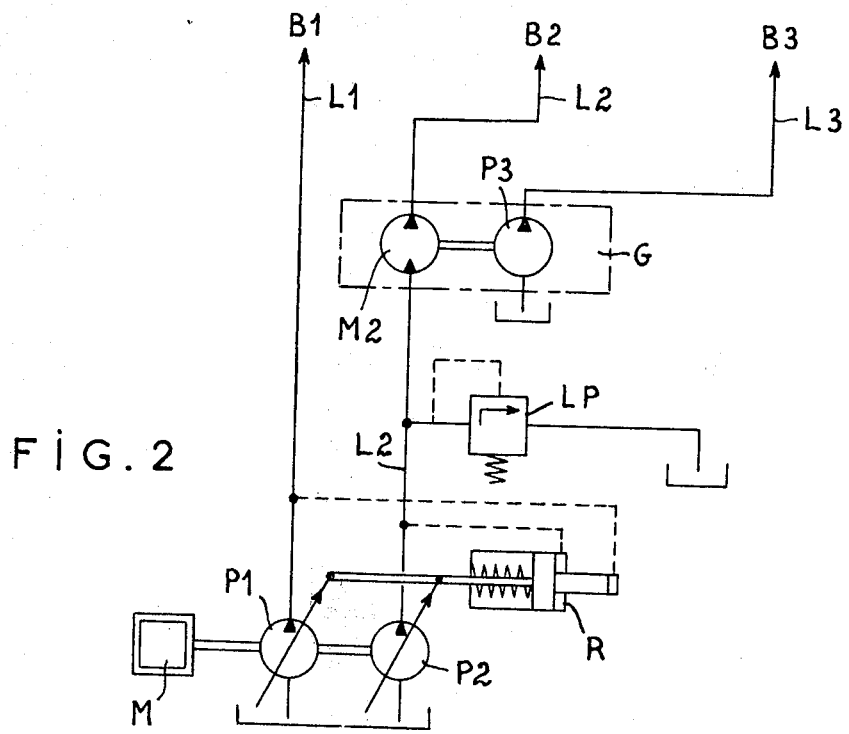
FIG. 2 is a typical embodiment of the invention diagrammatically illustrated.

The hydraulic power transmission circuits illustrated in FIG. 2 and constructed according to the basic principle of the invention constitutes an improvement of the art illustrated in FIG. 1 and the aforementioned British Patent Specification No. 1,128,657 and comprises to this end, likewise, a motor M driving a pair of variable-output pumps P1 and P2 each adapted to supply hydraulic fluid under pressure to hydraulic power lines L1 and L2, and a regulator R designed for varying simultaneously the outputs of both pumps as a function of the sum of the pressures prevailing in said lines, so that the sum of the power absorbed by each line remains constant.

According to this invention, a motor-pump unit G is inserted in one of the existing hydraulic power lines, for instance line L2. This unit G comprises a hydraulic motor M2 inserted in the existing hydraulic power line L2 fed from the variable delivery pump P2, and a constant delivery pump P3 coupled to, and driven from, said motor M2. This constant delivery pump P3 is inserted in an additional or subsidiary hydraulic power line L3. Both the motor M2 and the constant delivery pump P3 of motor-pump unit G may be of the vane type, or if desired of the piston or of the gear type. The discharge of the motor M2 feeds a downstream continuation of the line L2.

The existing hydraulic power lines L1 and L2 are each supplied with fluid from the two initial pumps P1 and P2, respectively, and the subsidiary or auxiliary power line L3 is fed with fluid from the constant delivery pump P3 and the continuation of line L2 is fed in the above-described manner. The three lines L1, L2 and L3 each feed to a distributing unit B1, B2 and B3, respectively. In the specific case that this invention is applied to a hydraulic power shovel, the distribution of the power circuits can be as follows, in relation to the conventional components of the shovel:

Line L1 and unit B1 supply pressure fluid to the bucket control cylinder, to the boom luffing cylinder and to the left-hand translation motor.

Line L2 and unit B2 deliver fluid to the arm control cylinder and to the right-hand transition motor.

Line L3 and unit B3 deliver fluid to the turret slewing motor.

The power W available in line L2 upstream of pump P2 is divided into a power W2 delivered to distributing unit B2 and a power W3 absorbed by motor M2. Assuming that the inevitable losses are considered as negligible, this power W3 transmitted to the pump P3 is thus transferred to the subsidiary line L3 feeding the distributing unit B3. Of course, the various power values involved prove the relationship $W = W2 + W3$.

Moreover, considering the mode of operation of the assembly, the regulator R becomes operative in the manner already mentioned hereinabove, whereby the total power available is properly distributed among the three lines L1, L2 and L3. A pressure limiting device LP is provided in the line between pump P2 and motor M2 for protecting the motor-pump unit G against any damage due to overload. In addition, the distributing units B1, B2 and B3 incorporate their specific protection means. Of course, the invention should not be construed as being strictly limited to the specific form of embodiment of the power distributor described herein by way of example with reference to a specific application, for on the contrary it encompasses all possible modifications and variations thereof, irrespective of the particular application contemplated. Thus, notably, the motor-pump unit G may comprise a plurality of pumps each adapted to supply fluid under pressure to a subsidiary line such as L3; besides, a second motor-pump unit may be inserted in line L1, whereby the number of simultaneous operating functions can be multiplied accordingly. Finally, it will be readily understood by those conversant with the art that the pair of pumps P1 and P2 associated with regulator R is no part of the present invention and may therefore be dispensed with and replaced by any other suitable and known constant-power supply system.

The embodiments of the invention in which an exclusive property of priviledge is claimed are defined as follows:

1. In a hydraulic power transmission system having a first pump feeding fluid to a first hydraulic power line; a fluid motor connected in the first line and being powered by fluid therein; a pressure regulating valve connected in the first line between the first pump and motor; a second pump coupled to the motor and being run thereby and feeding fluid to a second hydraulic power line which is in parallel relationship to the first line; the discharge flow of the motor feeding fluid to a downstream continuation of the first line; a third pump feeding fluid to a third hydraulic power line; the first and third pumps being coupled together and driven from a common power source; and a hydraulic servo means connected in the first and third lines for sensing differential pressure therebetween and for simultaneously setting the displacements of the first and third pumps in accordance with a preselected pressure differential value.

* * * * *